United States Patent
Cocciardi (10) Patent No.: US 9,850,635 B2
(45) Date of Patent: Dec. 26, 2017

(54) IRRIGATION NETWORK VALVE (71) Applicant: Country Cocky Pty. Ltd., Cranbourne, Victoria (AU)

(72) Inventor: Peter Anthony Cocciardi, Cranbourne (AU)

(73) Assignee: COUNTRY COCKY PTY. LTD., Cranbourne, Victoria (AU)

(*) Notice: Subject to any disclaimer, the term of this patent is extended or adjusted under 35 U.S.C. 154(b) by 165 days.

(21) Appl. No.: 14/904,397

(22) PCT Filed: Jul. 11, 2014

(86) PCT No.: PCT/AU2014/000711
§ 371 (c)(1),
(2) Date: Jan. 11, 2016

(87) PCT Pub. No.: WO2015/003217
PCT Pub. Date: Jan. 15, 2015

(65) Prior Publication Data
US 2016/0138236 A1 May 19, 2016

(30) Foreign Application Priority Data

Jul. 12, 2013 (AU) .............................. 2013902571
Jul. 29, 2013 (AU) .............................. 2013902805
Oct. 16, 2013 (AU) .............................. 2013903986

(51) Int. Cl.
*F16K 31/30* (2006.01)
*E02B 13/02* (2006.01)

(52) U.S. Cl.
CPC .............. *E02B 13/02* (2013.01); *F16K 31/30* (2013.01); *E02B 2201/50* (2013.01);
(Continued)

(58) Field of Classification Search
CPC ...... F16K 3/262; F16K 5/0428; F16K 5/0421; F16K 31/18; F16K 31/26; F16K 31/30;
(Continued)

(56) References Cited

U.S. PATENT DOCUMENTS 747,769 A * 12/1903 Richards ................. F16K 31/26
137/426
948,519 A * 2/1910 Neal ....................... F16K 31/32
137/447
(Continued)

FOREIGN PATENT DOCUMENTS

CN 2161787 4/1994
FR 2783891 3/2000
(Continued)

OTHER PUBLICATIONS

PCT International Search Report dated Aug. 11, 2014, PCT/AU2014/000711.
PCT Written Opinion dated Aug. 11, 2014, PCT/AU2014/000711.

*Primary Examiner* — Matthew W Jellett
(74) *Attorney, Agent, or Firm* — TraskBritt, P.C.

(57) ABSTRACT

Irrigation valves for channels and for irrigation tanks are of three types. All are activated by a pair of tilting float arms to which a pair of floats are attached. One type is a T-shaped duct with a cylindrical valve disposed at 90 degrees to the part that is connected to the incoming flow. The floats rotate the valve. The second type has the same construction as the first type, thereby giving flow control but additionally has a rise and fall gate in the duct part that is connected to the incoming flow. The gate acts as a stop valve. The third type has a cylindrical duct connectable to the incoming flow but no valve and provides both flow control and stop valve facilities through a rise and fall gate actuated by the tilting of the float arms.

18 Claims, 11 Drawing Sheets

(52) U.S. Cl.
CPC .... *Y10T 137/7365* (2015.04); *Y10T 137/7404* (2015.04); *Y10T 137/7446* (2015.04)

(58) Field of Classification Search
CPC ............... F16K 31/32; F16K 31/52408; F16K 31/52475; F16K 27/045; Y10T 137/7365; Y10T 137/741; Y10T 137/7413; Y10T 137/7404; Y10T 137/7446; Y10T 137/7449; Y10T 137/7465; Y10T 137/7468; Y10T 137/7478; Y10T 137/87981; Y10T 137/87989; E02B 13/02
USPC ................. 251/208, 209, 235, 251, 326, 345
See application file for complete search history.

(56) References Cited

U.S. PATENT DOCUMENTS

| | | | |
|---|---|---|---|
| 1,343,871 A | 6/1920 | Lewis | |
| 1,727,082 A * | 9/1929 | Rayfield | F16K 31/30 137/447 |
| 2,314,158 A * | 3/1943 | Peters | F16K 31/32 137/398 |
| 2,362,747 A | 11/1944 | Alfred | |
| 2,904,064 A * | 9/1959 | Davis | E03F 7/04 137/410 |
| 3,033,226 A * | 5/1962 | Allen | F16K 5/0421 137/315.07 |
| 3,127,909 A * | 4/1964 | Leo | F16K 5/0421 137/625.31 |
| 4,797,027 A * | 1/1989 | Combes | E02B 7/205 137/123 |
| 4,877,352 A * | 10/1989 | Tuttle | G05D 9/02 405/100 |
| 6,305,411 B1 | 10/2001 | Youssef | |
| 6,823,890 B1 * | 11/2004 | Hwang | F16K 31/26 137/443 |
| 6,953,156 B1 | 10/2005 | Boice, Jr. | |
| 7,431,264 B2 * | 10/2008 | Leroux | F16K 3/0281 251/118 |
| 7,584,939 B2 * | 9/2009 | Stiehl | E03F 9/00 137/423 |
| 2009/0120511 A1 | 5/2009 | Weingarten | |

FOREIGN PATENT DOCUMENTS

| | | |
|---|---|---|
| IL | 188274 | 5/2012 |
| JP | 61-32225 | 2/1986 |
| JP | 02-203089 | 8/1990 |
| JP | 201078224 | 4/2010 |
| WO | 2015003217 | 1/2015 |

* cited by examiner

IRRIGATION NETWORK VALVE

CROSS-REFERENCE TO RELATED APPLICATIONS

This application is a national phase entry under 35 U.S.C. §371 of International Patent Application PCT/AU2014/000711, filed Jul. 11, 2014, designating the United States of America and published in English as International Patent Publication WO 2015/003217 A1 on Jan. 15, 2015, which claims the benefit under Article 8 of the Patent Cooperation Treaty to Australian Patent Application Serial Nos. 2013903986 filed Oct. 6, 2013, 2013902805 filed Jul. 29, 2013, and 2013902571 filed Jul. 12, 2013.

TECHNICAL FIELD

This disclosure concerns flow control valves for immersion in channels of the type built for irrigation.

BACKGROUND

Irrigators rely on channels for delivery of water to areas where crops are grown. Such areas may have a laser-levelled surface so that an inbuilt incline ensures the water runs to the end of the channel whenever water is available.

When a head develops in the water supply network, the end of the channel overflows. If this continues, the ground surrounding the overflow site becomes muddy and the roots of the growing crop lack air and die. The grower loses a percentage of the crop and the muddy area is an obstacle to the free movement of the wheels of irrigation equipment.

The flow in the channels is ensured by bulk water delivered to the channels through pipes. In related Australian Patent Serial No. 2013902571, float-operated valves are described that include a rise and fall stop gate capable of stopping flow in the pipe supplying an installation such as a LINDSAY® overhead irrigation device.

U.S. Pat. No. 1,343,871 describes a system for supplying water to different parts of a field by a pipe that fills a group of containers, each with its own float valve to allow water to flow to subsidiary boxes. A ball float on the end of an arm that progressively closes a valve to a valve seat stopping the flow is out of sight inside the container.

U.S. Pat. No. 2,362,747 describes a chain of tanks, each with an outlet for discharge into a soil channel. A control tank in the chain contains a float valve that opens and closes a valve in a pipe that supplies the whole chain.

U.S. Pat. No. 6,953,156 describes a system for irrigating sloping land. This too relies on a ball-type float valve that controls water entry into a distributor tank from which branch pipes flow to different areas depending on their slope.

The ball valves used for these systems cannot be inspected and maintained easily.

BRIEF SUMMARY

The apparatus aspect of the disclosure provides a stop valve for a duct pipe feeding an irrigation channel comprising a duct with an inlet and an outlet, a rise and fall gate between the inlet and outlet, a pair of float arms supported on pivots lying on an axis transverse to the duct direction and a float for determining the inclination of each float arm.

The duct may be linear with the gate at 90 degrees to the duct axis. The gate may have static guides that are wider than the inlet portion of the valve body and a flat gate that slides in the guides between an open position clear of the inlet portion and a closed position in which the gate lies in register with the inlet portion, thereby preventing flow.

The float arms may be rods that are free to rotate about the pivots, attached at one end to the rise and fall gate plate and at the opposite end to the float. The float may be spaced from the end of an aim by a rigid link.

Thus, when the floats ascend, the arms rotate to an inclined position in which the gate is drawn downward to its closed position. The duct may have a semi-circumferential slot in its upper half through which the leading edge of the gate plate projects. The leading edge may be semi-circular in order to conform to the circumferential wall of the duct.

The gate plate may be substantially M-shaped with the upright outer members sliding in the gap between the parallel edges of the gate guides.

The inlet may have a ring flange for joining it to the ring flange of a pipe, which supplies the channel.

Utilizing such an apparatus, channel overflow may be prevented with consequent crop saving.

Utilizing such an apparatus, although the valve may not be watertight, leakage level is acceptable.

Utilizing such an apparatus, the valve requires minimal maintenance and has reduced vulnerability to blockage.

A second apparatus aspect of the disclosure provides a stop valve for a tank comprising a duct with an inlet and an outlet, a rise and fall gate between the inlet and outlet, a float arm supported by the duct operable to open and close the gate in response to rise and fall movement of the float.

The duct may be T-shaped with the two outlets lying at 90 degrees to the inlet providing an axis parallel to the gate, whereby the float arm is pivotable about the axis, the gate being at one end of the arm and a float at the opposite end.

The T-shaped body has a cylindrical outlet portion with pairs of circumferential slots lying mutually opposite, and a coaxial sleeve inside the outlet portion, which is rotatable, in order to support a pair of parallel float arms that extend through the sleeve and the circumferential slots in order to connect the gate to a pair of floats attached to the float arms.

The circumferential gap between the valve sleeve and the valve body may be bridged by self-lubricating strip bearings.

The gate may have static guides that are wider than the inlet portion of the valve body and a flat gate that slides in the guides between an open position clear of the inlet portion and a closed position in which the gate lies in register with the inlet portion, thereby preventing flow.

The float arms may be rods fixed to the sleeve but free to rotate in the circumferential slots in order to cause the gate to execute linear motion moving from rise to fall and back. Each float arm may be connected to the gate by a link that accommodates the difference in linear and arcuate motion.

Thus, when the floats ascend, the arms rotate to an inclined diametrical position in which the gate is drawn downward to its closed position. As the floats descend, the arms rotate in the counter direction to a second inclined position in which the gate is elevated to its open position.

When the float arms lie horizontally, the gate lies in an intermediate position in which some flow restriction is imposed.

The leading edge of the sliding gate may be arrowhead shaped or convex.

The inlet portion of the valve body may have a ring flange for bolting the end of a branch pipe forming part of the distribution network.

A further apparatus aspect of the disclosure provides a combined flow regulator and stop valve comprising a T-shaped valve body with an inlet axis and an outlet axis lying transversely to the inlet axis, a gate disposed across the inlet parallel to the outlet axis, a cylindrical portion of the valve body disposed about the outlet axis, a cylindrical valve member retained in the cylindrical portion, having a flow aperture connecting the inlet to the outlet or outlets, pairs of circumferential slots in the cylindrical portion of the valve body and a pair of arms that pass diametrically through both the pairs of slots and the valve body, one end of each arm being attached to the gate, the opposite end being attached to a float, whereby ascent of the floats both rotates the valve member to reduce flow and causes the gate to move from an open position toward a closed position and descent of the floats also rotates the valve member to increase flow and causes the gate to move toward the open position.

Preferably, the inlet axis is disposed at 90 degrees to the outlet axis.

One apparatus aspect of the disclosure provides a flow-regulating valve for a liquid container comprising a valve body with an inlet and at least one outlet, a rotary valve member in the body, wherein the valve body has means to rotate the valve member in response to the water level outside the valve body in the container, thereby regulating flow rate.

The valve body may be cylindrical. The valve member may likewise be cylindrical.

The valve member rotates in response to the rise and fall of one or more floats.

The valve body is cylindrical having two ends, an inlet between the ends and the valve body may have a passage connecting the inlet with one or both ends, the rotation of the valve member being dependent on the rise and fall of the water level in the container.

The valve member may have a float arm projecting through the valve body and a float connectable to the float arm.

Preferably, the valve member is rotated by a pair of arms.

The body may have a slot for each arm extending 22-45 degrees around the circumference of the body. The valve member may rotate coaxially in the body and have a cutout shaped to change the flow as rotation occurs.

The valve may have bearings attached to the body or the member, which facilitate rotation. The bearings may be spaced at 120 degrees. The bearings may be circumferential strips of material with a low coefficient of friction.

The float arms may extend through the wall of the valve member being removably fixed to the member at one end. The opposite end may carry a counterweight biasing the member to the fully open position. The float arms retain the valve member inside the valve body, allowing its rotation but preventing axial movement.

The free ends of the float arms each have a chain shackle that allows the floats to be attached by chains.

The valve body may be made of plastic but will more usually be made of stainless steel. The diameter of the valve body may be 200 mm to 1800 mm. The wall thickness of the valve member may be 2 mm to 20 mm.

Another apparatus aspect provides a water distribution system comprising a bulk water container with a water inlet and one or more outlets for distributing water to land, a water inlet for receiving water from a pipe network, and a flow regulator admitting water to the container, wherein the regulator has a rotating flow restrictor that is float activated.

Utilizing such an apparatus, fluctuating network pressures are coped with while maintaining the required flow rate.

Utilizing such an apparatus, it is relatively easily inspectable for maintenance with few wearing parts requiring replacement.

BRIEF DESCRIPTION OF THE DRAWINGS

One embodiment of the disclosure is now described with reference to the accompanying drawings, in which.

DETAILED DESCRIPTION

Figure 1:
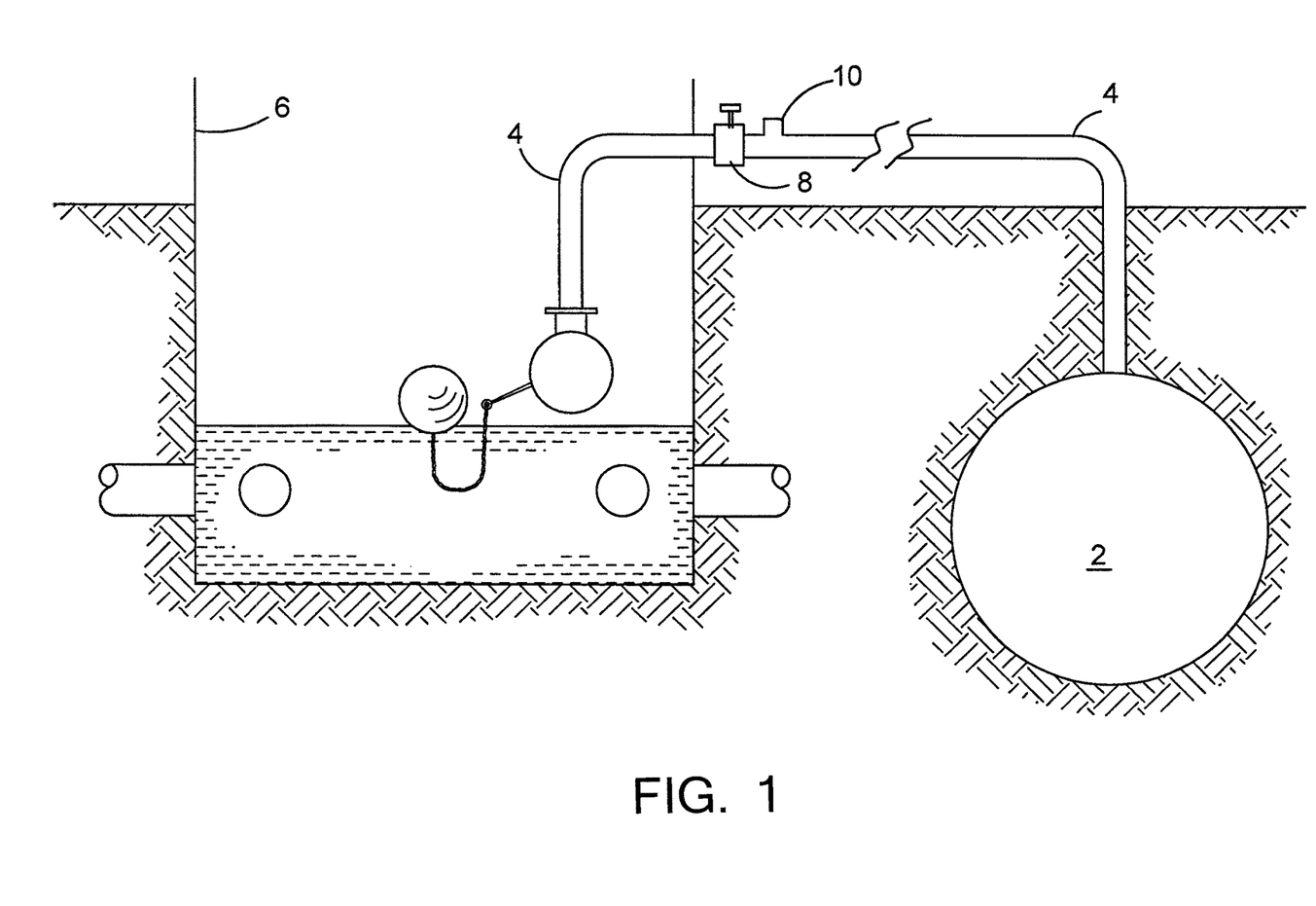
FIG. 1 is a diagrammatic section of farmland supplied by a network pipe through a distribution tank.

Referring now to FIG. 1, network pipe 2 is 900 mm in diameter and branch pipe 4 brings water to the 1200-mm diameter tank 6 through a butterfly valve 8 past a flow meter 10.

Figure 2:
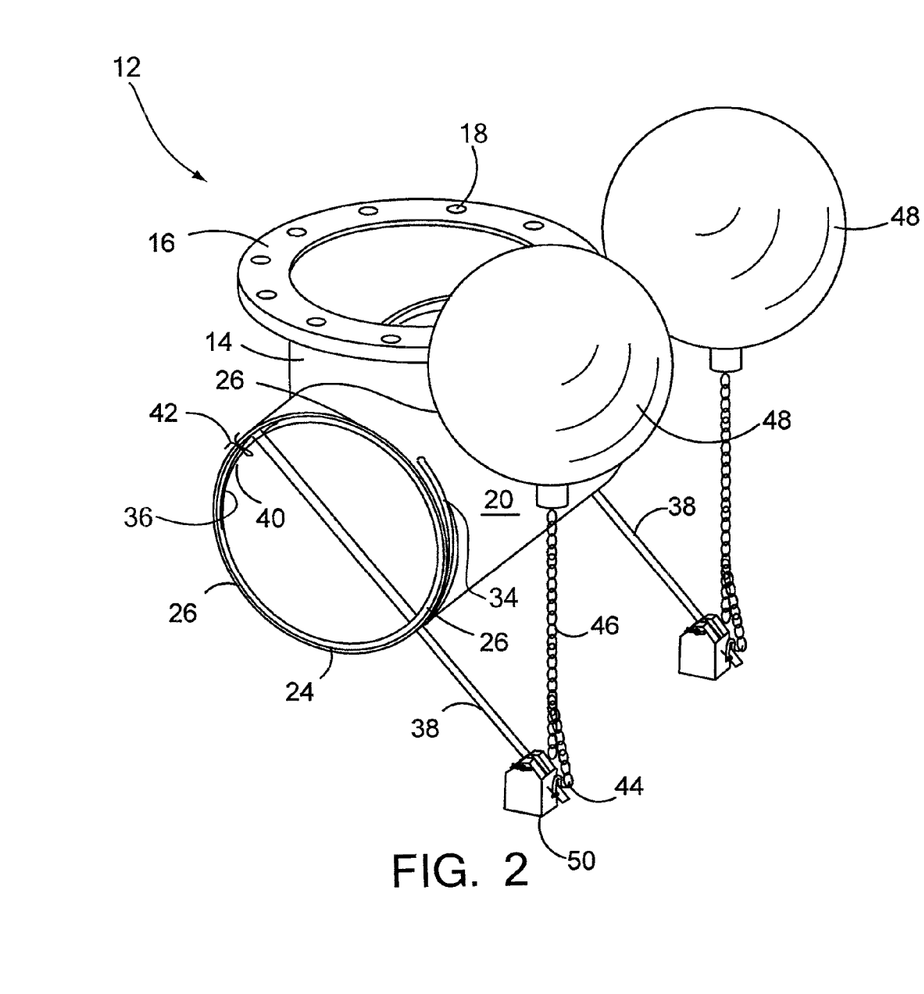
FIG. 2 is a perspective view of the regulator valve and floats.
Figure 3:
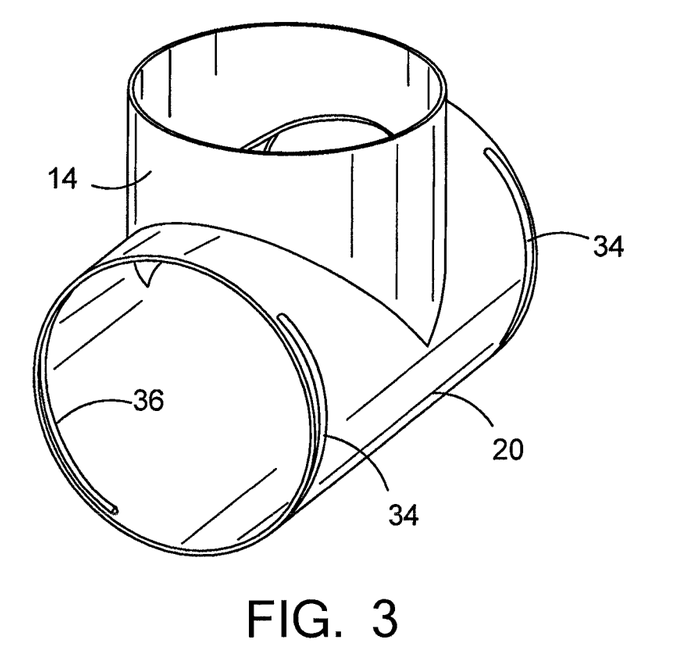
FIG. 3 is a perspective view of the valve body.

Referring now to FIGS. 2 and 3, the regulator valve 12 is bolted to the end of the branch pipe 4 and discharges into the tank. The valve body stem 14 is a T-shaped pipe of 320 mm diameter, the body being 510 mm long and the valve body stem 14 terminating in a connector ring 16 with bolt holes 18 for connection to the end of the branch pipe 4. Both the body 20 and the valve member 22 (FIG. 4) are made of stainless steel. Water enters the regulator valve 12 via the valve body stem 14 and discharges through the open ends of the body 20. The flow through the valve is controlled by the valve member 22, which is a sleeve of the same length as the valve body, namely 510 mm.

Referring now to FIG. 2, the circumferential gap 24 is bridged by a trio of bearing strips 26 made of a slippery polymer and attached to the edge of the valve member by stainless steel fasteners (not shown). The strips are spaced at 120 degrees, enabling the member to rotate in the body with minimum friction.

Figure 4:
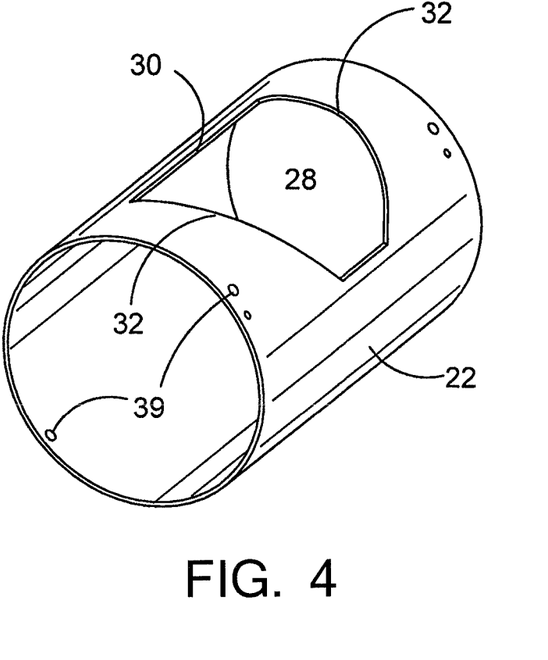
FIG. 4 is a perspective view of the valve member.

Referring now to FIG. 4, the crown of the valve member 22 has a cutout 28 with a straight edge 30 and tapered edges 32 extending over about 90 degrees of the circumference of the member. The cutout 28 lies in register with the connector ring 16.

The ends of the valve body 20 have pairs of slots 34, 36, 11 mm wide (see FIGS. 2, 3 and 5) extending 90 degrees around the quadrants facing the water below the valve body 20. The slots 34, 36 define the path of a pair of 10-mm diameter stainless steel rods 38 that are a slide fit in the slots. The rods pass through bores 39 near the edge of the valve member and are bent at one end into a foot 40 (FIG. 2) that is secured to the valve member by a split pin 42 (FIG. 2). The foot 40 is housed in the thickness of the valve member 22 and the end of the pin 42 rides in the slot in the valve body.

Referring to FIG. 2, the opposite end of each rod has a bore that receives a shackle 44 for connecting the arm to float chain 46. The chain is about 600 mm long and runs through the shackle and is attached to itself. The chains each capture a spherical molded plastic float 48. The floats are balanced by pivoted counterweights 50. The chain 46 adjusts to suit the water level required. This allows for almost any water level required to be accommodated without affecting the functionality of the valve.

In use, the pipework is installed and the valve is suspended above or within the operational range of water levels in the tank. The floats lie on the surface of the water and the counterweights rotate the valve body to the open position. As the land dries and the tank empties the floats lie on the tank floor.

When the operator opens the butterfly valve 8, the meter begins to measure flow. The operator selects a suitable flow rate and the container allows inflow to feed the outflow pipes.

The tank level rises and equilibrium is established. If the incoming flow fluctuates, the valve restores the equilibrium by rotating.

It is not the purpose of the valve to halt flow. That is the task of the butterfly valve 8. The valve ensures a constant head of water in the tank, whereby the irrigation proceeds in an orderly manner despite the fluctuations in the network. A head of 3 m to 5 m is usual in such networks, but this may spike to 10 m.

Figure 5:
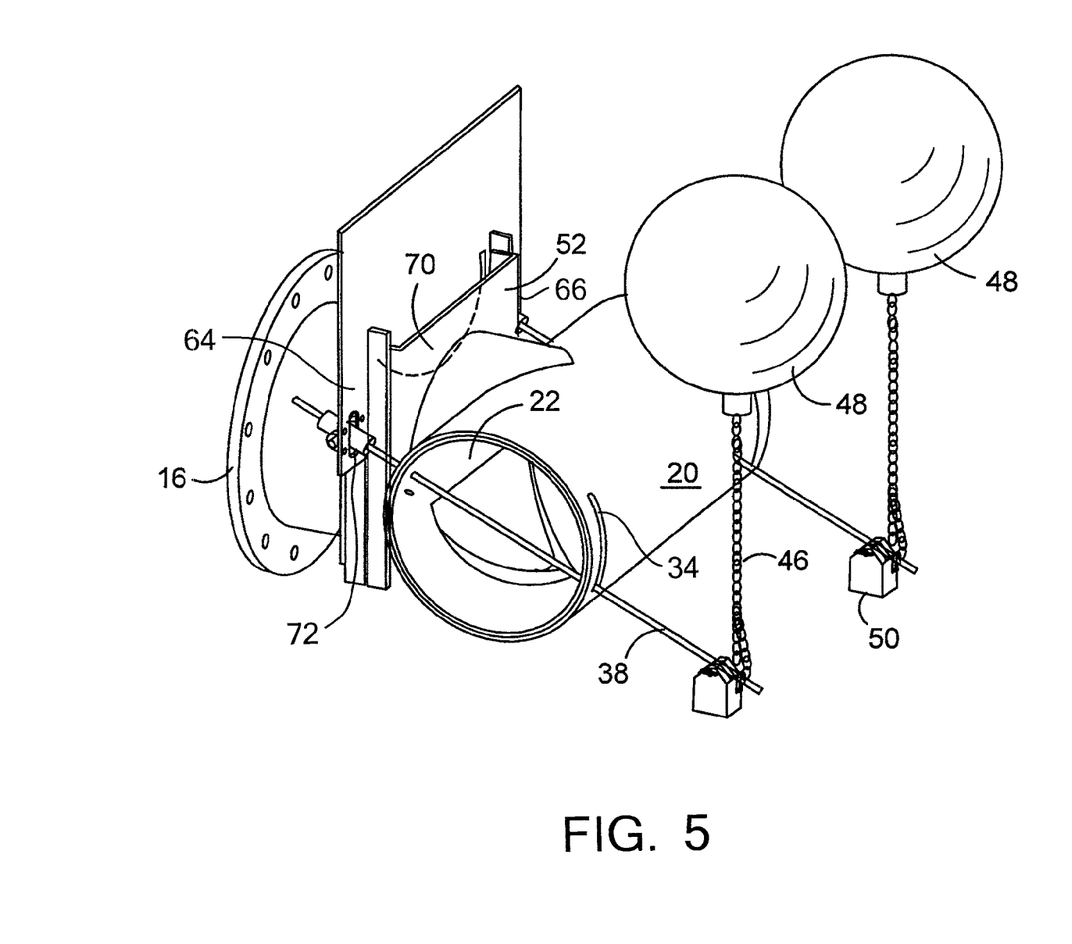
FIG. 5 is a perspective view of a second embodiment with an added stop valve in the open position.
Figure 5A:
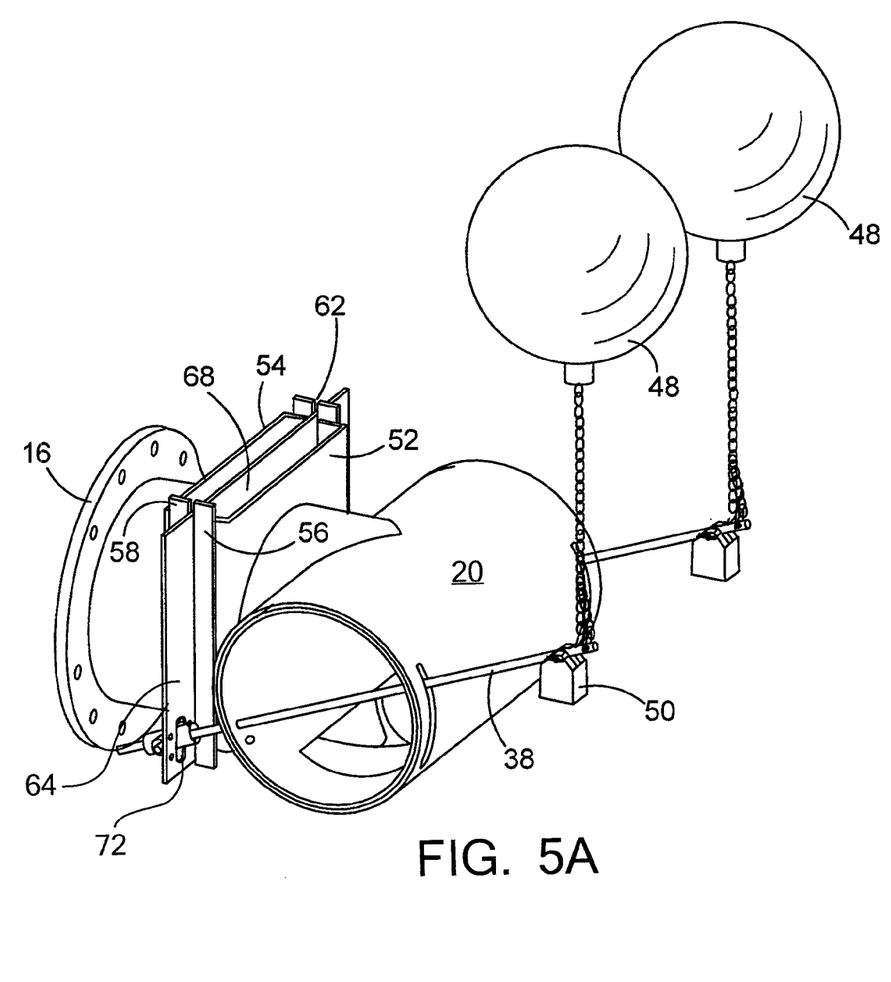
FIG. 5A is the same as FIG. 5 with the added stop valve in the closed position.
Figure 6:
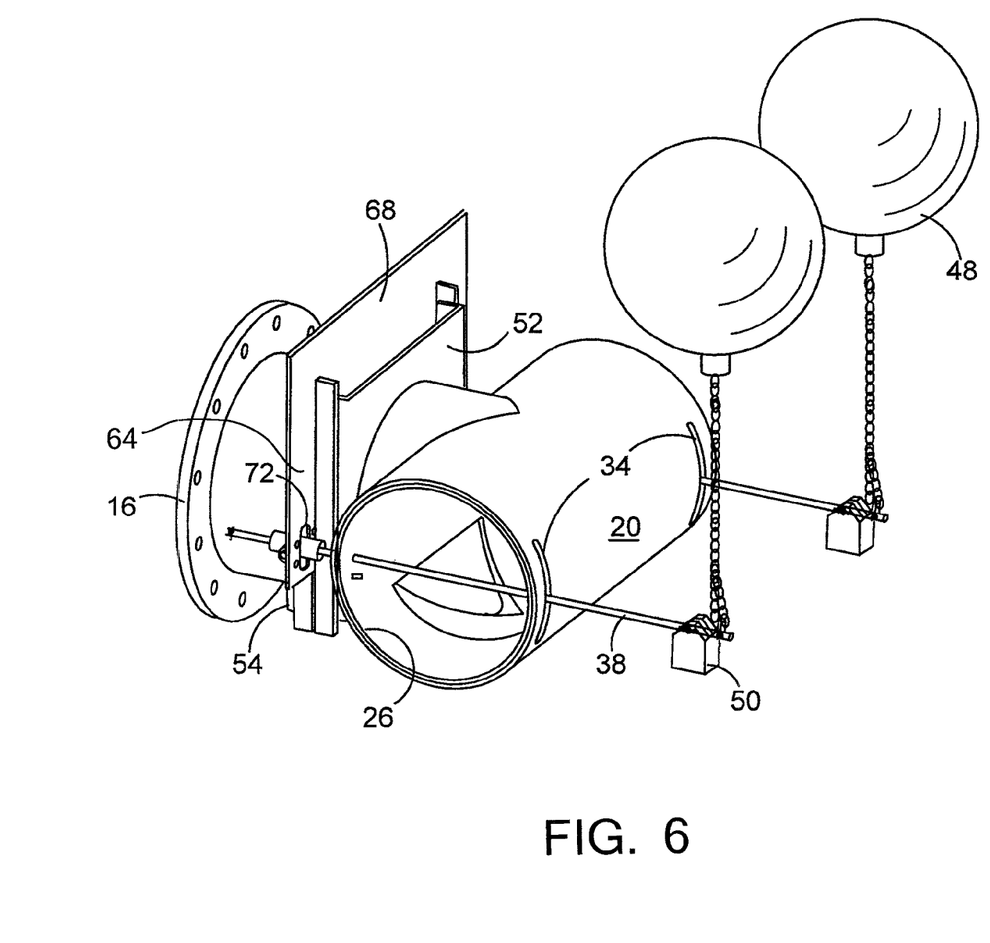
FIG. 6 is the same as FIG. 5 with the stop valve in an intermediate position.

In a second embodiment, FIGS. 5, 5A and 6 show valve body stem 14 is divided by a pair of square frame plates 52, 54. Plate 52 is attached to the valve body 20. Plate 54 is attached to the part of the stem with the connector ring 16. The gap 62 between the parallel plates 52, 54 is bridged by pairs of gate guides 56, 58 attached to the upright side edges of frame plates 52, 54. For both guides 56, 58, the gate gap 62 extends the full length of the guide.

The gate itself is a modified M-shape made of steel sheet that is wider than the gate guides spacing and has two legs 64, 66 joined by an upper part 68 with a convex leading edge 70. The legs have slots 72, 74 for reception of the pivoting connections 76, 78 (FIG. 7) of float arms 38.

In the open position shown in FIG. 5, the gate rises clear of the frame plates 52, 54. In the closed position shown in FIG. 9, the leading edge 70 meets the circular perimeter of valve body stem portion 14 and the part 68 registers with the frame plates 52, 54.

Figure 7:
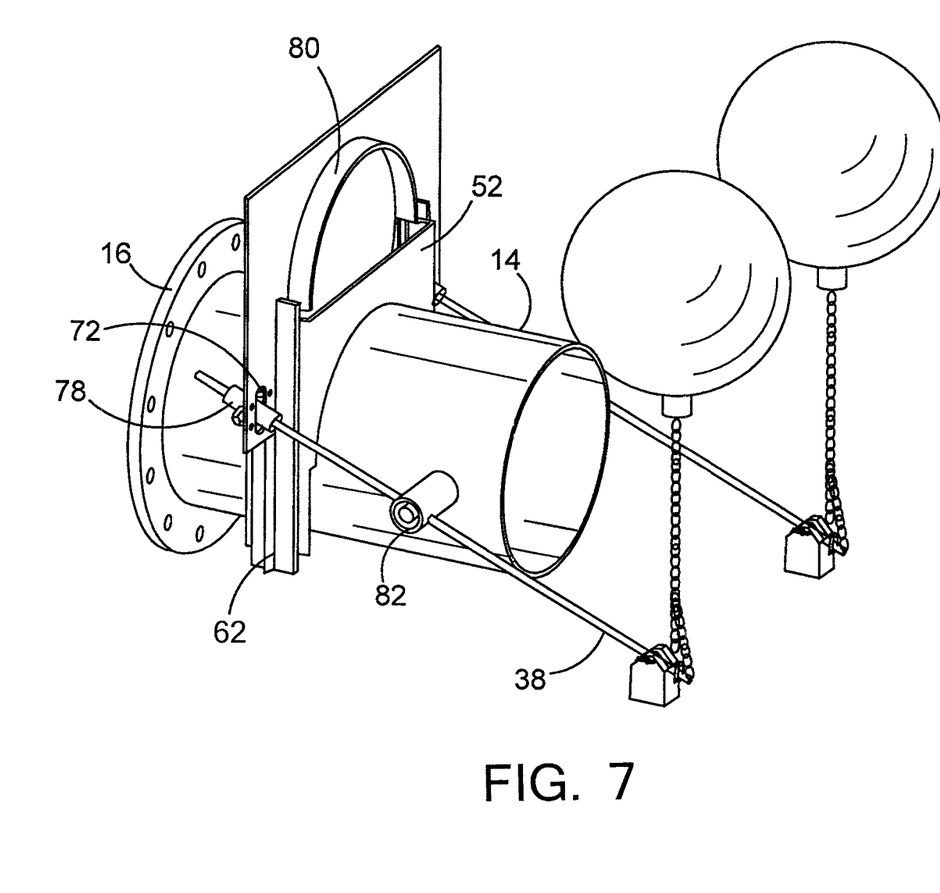
FIG. 7 is a perspective view.
Figure 9:
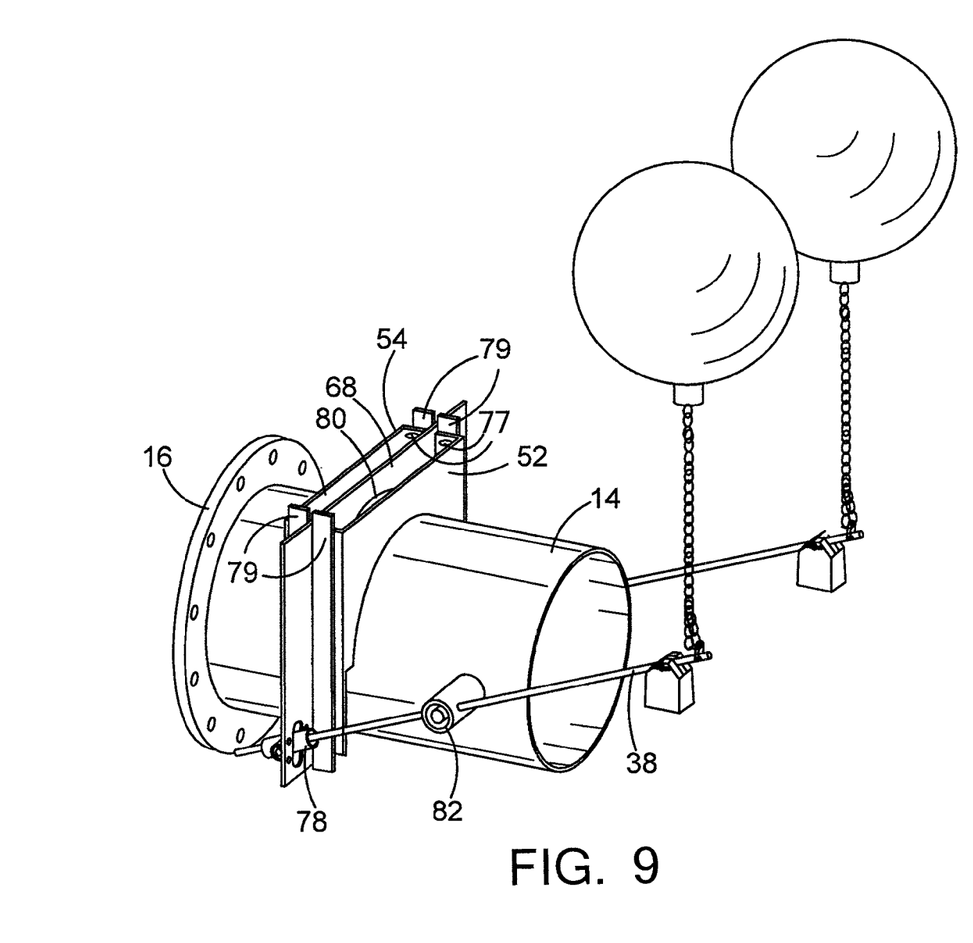
FIG. 9 is a perspective view when in the gate closed position.

The float arms 38 are fixed to the sleeve 22 to ensure that the floats exert the same uplift force as in the previous embodiment. The pivoting connections each have a central self-lubricating bush through which the float arm is free to slide in order to accommodate the linear rise and fall of the gate. The projection of the rods through the legs 64, 66 is seen in FIGS. 6, 7 and 9. The counterweights' mass is increased to adjust for the weight of the gate.

The float arms lie in an intermediate position when the tank is both filling with network inflow and emptying into the irrigation pipes. The cutout 28 of sleeve 22 registers with the valve body stem 14 and, from this position, the floats quickly react to any increase in head. If the head persists, the floats press the gate into the closed position. As the tank drains, the floats descend. If the head has diminished, the gate may not reopen. If the tank drains further, the gate may reopen.

Figure 11:
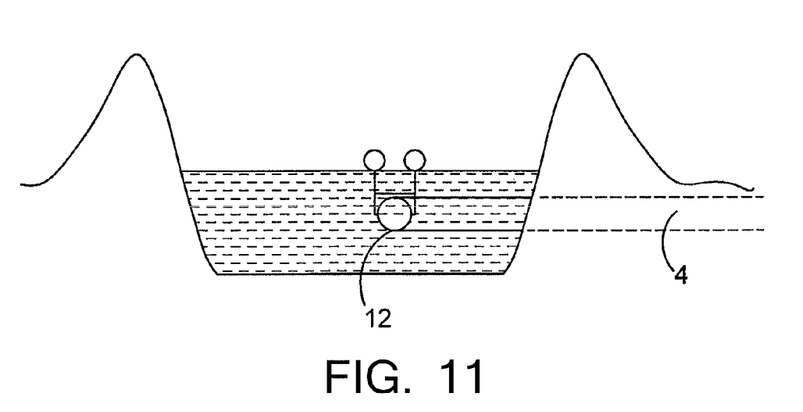
FIG. 11 is a cross-sectional diagram of a channel in which the device is deployed.

In a third embodiment, FIG. 11 shows an irrigation channel 3 m to 4 m wide and 2 m deep that is fed by a steel pipe that brings pumped water from a bulk source such as a dam. The shape of the channel is as shown in FIG. 11 and the pipe is submerged so that the floats can exert flow control on the incoming water.

Figure 8:
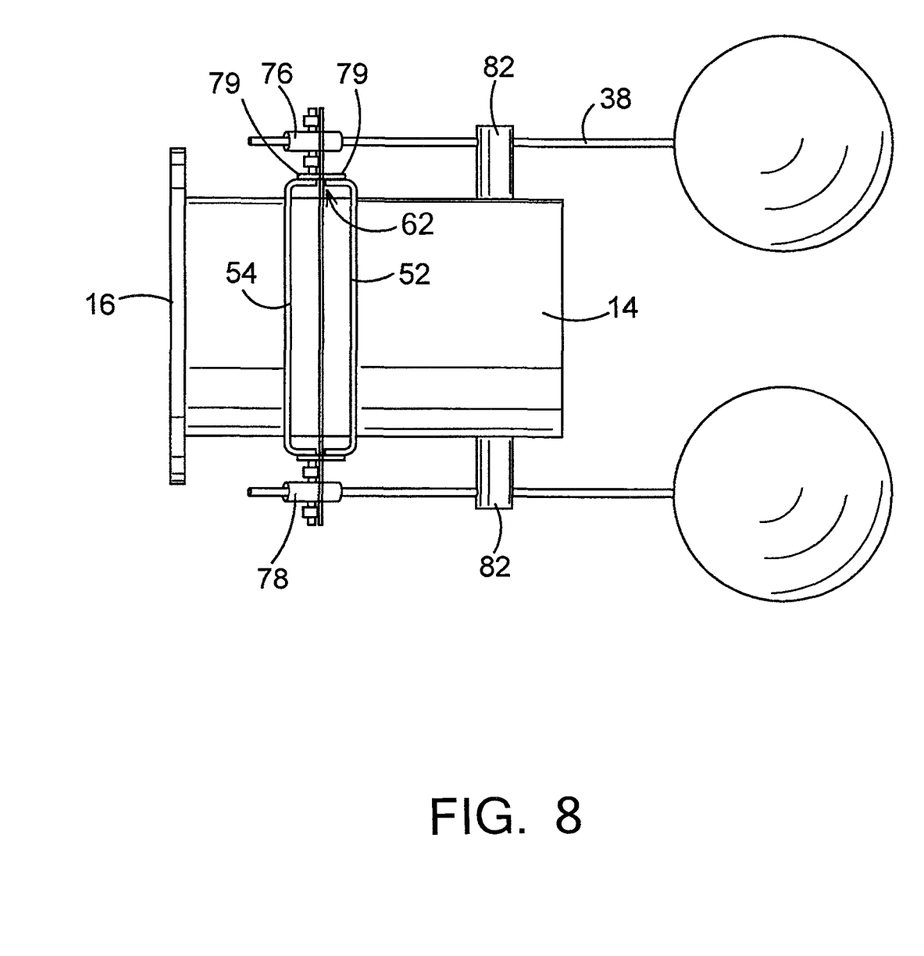
FIG. 8 is a plan view of FIG. 7.

Referring now to FIGS. 8 and 9, the float-activated stop valve is connected to the external delivery conduit by ring flange 16. Stem 14 is 300 mm in diameter and 700 mm long. The rise and fall gate straddles an incision (not shown) in the upper half of valve body stem 14. The steel gate guides 56, 58 are separated by gap 62 and welded to the outer surface of the valve body stem 14. Gate gap 62 extends the full length of the guides.

Figure 10:
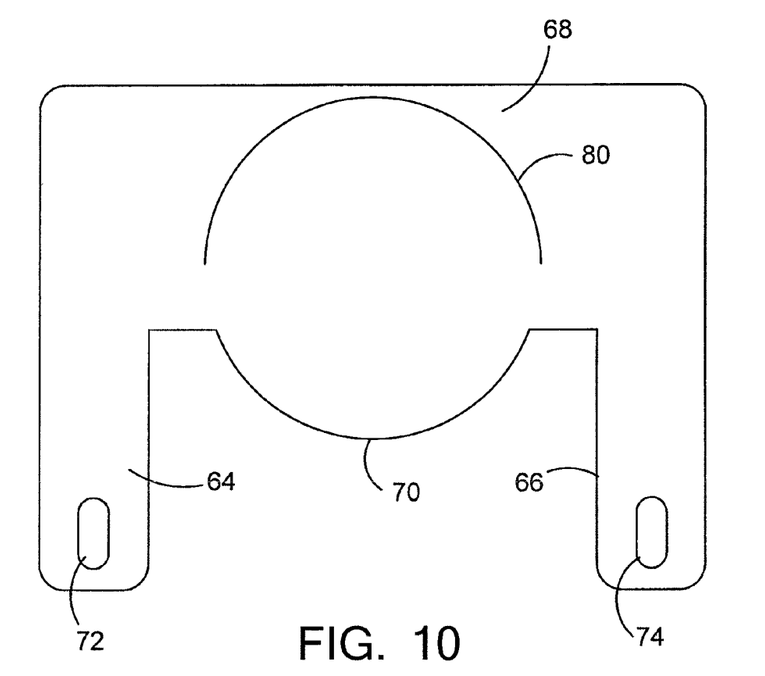
FIG. 10 is a front view of the gate plate.

The gate itself (see FIG. 10) is a modified M-shape, made of stainless steel that is wider than the width of the gate guides and has two legs 64, 66 joined by an upper part 68 with a convex leading edge 70. The legs have slots 72, 74 for the reception of the pivoting connections 76, 78 of float arms or rods 38. The guides 56, 58 have pairs of slots 77 adjacent gate gap 62 in order to support the screws of pairs of vertical self-lubricating polymer strips 79. The slots 77 allow accurate adjustment of gap 62 size leading to smooth motion of the gate. Upper part 68 supports a semi-circular collar 80, 25 mm wide, which overlies the incision when the gate is closed. In the closed position, the convex leading edge 70 contacts the circular wall of the stem.

The 22.5 degree rotary motion of the float arms 38 is made possible by the horizontal transverse pivots 82 welded to the outside wall of the valve body stem 14. The counterweights and floats work in the same way as described in related Australian Patent Application Serial No. 2013902805. The water flow passes between the parallel float arms.

Figure 12:
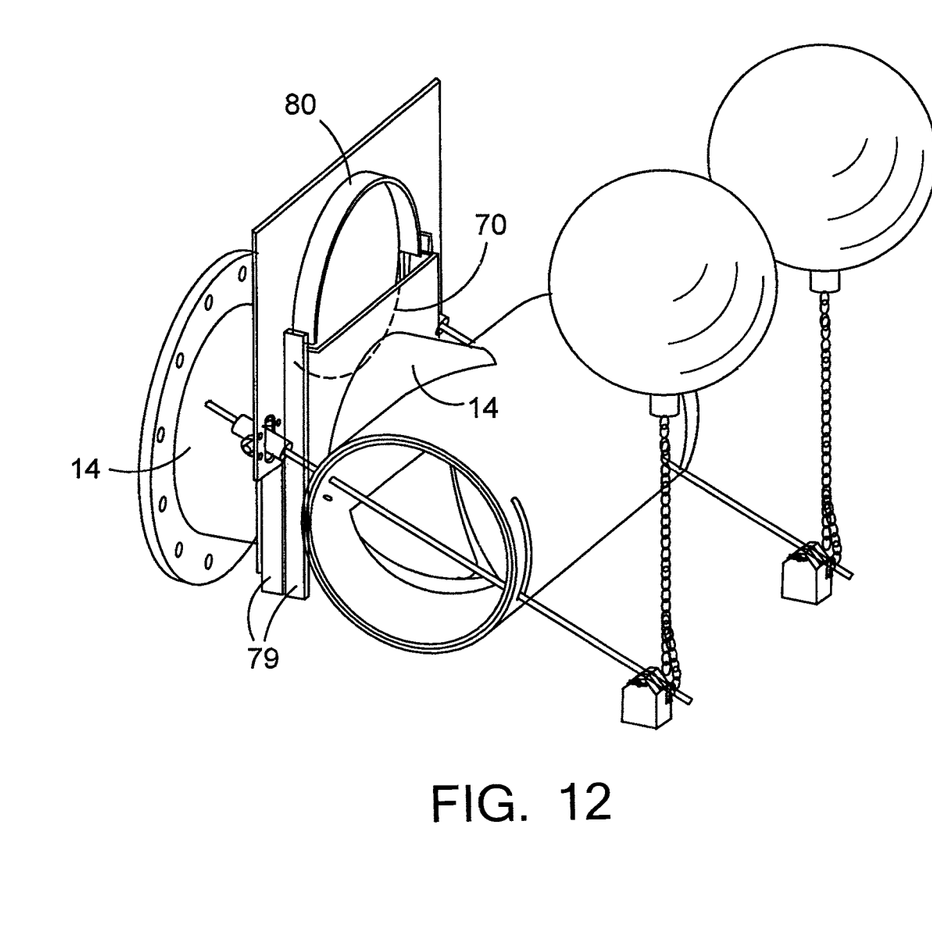
FIG. 12 is a perspective of the valve in FIG. 5 with a gate collar.

Referring now to FIG. 12, the leading edge 70 closes the duct by descending to contact the lower cylindrical wall of the valve body stem 14. The semi-circular collar 80 then rests on the upper part of the same wall.

It is to be understood that the word "comprising" as used throughout the specification is to be interpreted in its inclusive form, i.e., use of the word "comprising" does not exclude the addition of other elements.

It is to be understood that various modifications of and/or additions to the disclosure can be made without departing from the basic nature hereof. These modifications and/or additions are, therefore, considered to fall within the scope of the invention.

The invention claimed is:

1. A stop valve for a tank or irrigation channel, the stop valve comprising:
   a duct with an inlet and an outlet,
   a rise and fall gate between the inlet and outlet, and
   a float arm supported by the duct operable to open and close the gate in response to rise and fall movement of a float, the float arm pivotable about an axis parallel to the gate, the gate being at one end of the arm and the float at the opposite end,
   wherein the duct has a valve body including a cylindrical outlet portion with a circumferential slot in a coaxial sleeve inside the outlet portion that is rotatable in order to support the float arm that extends through the sleeve and the circumferential slot in order to connect the gate to the float attached to the float arm.

2. The stop valve as claimed in claim 1, wherein a circumferential gap between the coaxial sleeve and the valve body is bridged by self-lubricating strip bearings.

3. The stop valve as claimed in claim 1, wherein the gate has static guides that are wider than the inlet portion of the valve body and a flat gate that slides in the guides between an open position clear of the inlet portion and a closed position in which the gate lies in register with the inlet portion, thereby preventing flow.

4. The stop valve as claimed in claim 1, wherein the float arm is a rod fixed to the sleeve but free to rotate in the circumferential slots in order to cause the gate to execute linear motion moving from rise to fall and back.

5. The stop valve as claimed in claim 1, wherein the float arm is connected to the gate by a link that accommodates the difference in linear and arcuate motion.

6. The stop valve as claimed in claim 1, wherein a leading edge of the sliding gate is arrowhead shaped or convex.

7. The stop valve as claimed in claim 1, wherein the inlet portion of the valve body has a ring flange for bolting the end of a branch pipe forming part of the distribution network.

8. The stop valve as claimed in claim 1, wherein the duct is T-shaped with the two outlets lying at 90° to the inlet.

9. The stop valve as claimed in claim 1, wherein the valve body has a second float arm parallel to the float arm and supported in a second circumferential slot lying mutually opposite the circumferential slot.

10. A The stop valve as claimed in claim 9, wherein the pair of float arms are rods that are free to rotate about pivots, attached at one end to a rise and fall plate of the gate and at the opposite end to the float.

11. The stop valve as claimed in claim 10, wherein the gate plate is substantially M-shaped with a pair of upright outer members sliding in a gap between edges of the gate guides.

12. A combined flow regulator and stop valve comprising:
a T-shaped valve body with an inlet axis and an outlet axis lying transversely to the inlet axis,
a gate disposed across the inlet parallel to the outlet axis,
a cylindrical portion of the valve body disposed about the outlet axis,
a cylindrical valve member retained in the cylindrical portion, having a flow aperture connecting the inlet to the outlet or outlets,
pairs of circumferential slots in the cylindrical portion of the valve body, and
a pair of arms that pass diametrically through both the pairs of slots and the valve body, one end of each arm being attached to the gate, the opposite end being attached to a float,
whereby ascent of the floats both rotates the valve member to reduce flow and causes the gate to move from an open position toward a closed position and descent of the floats also rotates the valve member to increase flow and causes the gate to move toward the open position.

13. The combined flow regulator and stop valve as claimed in claim 12, wherein the inlet axis is disposed at 90° to the outlet axis.

14. The combined flow regulator and stop valve as claimed in claim 12, further comprising a rotary valve member in the body, wherein the valve body has means to rotate the valve member in response to the water level outside the valve body in a container, thereby regulating flow rate.

15. The combined flow regulator and stop valve as claimed in claim 12, wherein the valve member rotates in response to the rise and fall of one or more floats.

16. The combined flow regulator and stop valve as claimed in claim 12, wherein the body has a slot for each arm extending 20-45 degrees around the circumference of the body.

17. The combined flow regulator and stop valve as claimed in claim 12, wherein the valve member rotates coaxially in the body and has a cutout shaped to change the flow as rotation occurs.

18. The combined flow regulator and stop valve as claimed in claim 12, wherein the float arms extend through the wall of the valve member being removably fixed to the member at one end and the opposite end carries a counterweight biasing the member to the fully open position.

* * * * *